United States Patent
Lee et al.

(10) Patent No.: US 6,235,203 B1
(45) Date of Patent: May 22, 2001

(54) CRYSTALLIZATION PROCESS FOR REMOVING FLUORIDE FROM WASTE WATER

(75) Inventors: Mao-Sung Lee, Hsinchu; Chi-Chung Liao, Hsinchu Hsien; Ren-Yang Horng, Hsinchu, all of (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/247,073

(22) Filed: Feb. 9, 1999

(30) Foreign Application Priority Data

Jun. 23, 1998 (TW) .................................. 87110124

(51) Int. Cl.$^7$ ...................................... C02F 1/58
(52) U.S. Cl. .................. 210/711; 210/724; 210/726; 210/915
(58) Field of Search .................. 210/723, 724, 210/726, 710, 711, 712, 713, 915

(56) References Cited

U.S. PATENT DOCUMENTS

| | | | | |
|---|---|---|---|---|
| 4,436,629 | * | 3/1984 | Berglund | 210/724 |
| 5,043,072 | * | 8/1991 | Hitotsuyanagi et al. | 210/915 |
| 5,106,509 | * | 4/1992 | Jansen | 210/715 |
| 5,750,033 | * | 5/1998 | Ikeda et al. | 210/915 |

FOREIGN PATENT DOCUMENTS

| | | | |
|---|---|---|---|
| 06190373 | * | 7/1994 | (JP) . |
| 06320168 | * | 11/1994 | (JP) . |
| 07171577 | * | 7/1995 | (JP) . |

OTHER PUBLICATIONS

M. Schöller, J.C. Van Dijk, DHV Water BV and O. Wilms, "Fluidized Bed Pellet Reactor to Recover Metals or Anions"—Metal Finishing, p. 49, col. 1, Nov. 1991.*

* cited by examiner

Primary Examiner—David A. Simmons
Assistant Examiner—Frank M. Lawrence
(74) Attorney, Agent, or Firm—Sughrue, Mion, Zinn, Macpeak & Seas, PLLC

(57) ABSTRACT

The present invention provides a crystallization process for removing fluoride from waste water. Fluoride-containing waste water is introduced into a fluidized bed crystallizer provided with a carrier. A water soluble sodium reagent and a water soluble aluminum reagent are added into the fluidized bed crystallizer to form crystallized cryolite ($Na_3AlF_6$) onto the carrier. The treated waste water is separated from the fluidized bed crystallizer to obtain a primary treated water. The formed cryolite is in the form of crystals, which contain about less than 10% water, and is very convenient for re-utilization.

8 Claims, 3 Drawing Sheets

CRYSTALLIZATION PROCESS FOR REMOVING FLUORIDE FROM WASTE WATER

BACKGROUND OF THE INVENTION

1. Field of the Invention

The present invention relates to a crystallization process for removing fluoride from waste water in an economic and efficient manner.

2. Description of the Prior Art

In various industries, including the production of semiconductors, chlorofluorocarbon (CFC) and glass, a large amount of fluoride-containing waste water with a high concentration of fluoride is produced. Therefore, many researchers have attempted to remove fluoride from the fluoride-containing waste water.

Jansen in U.S. Pat. No. 5,106,509 has disclosed a crystallization process for removing fluoride from waste water in a fluidized bed reactor. The process involves adding $CaCl_2$ into waste water to react calcium ions and fluoride in the waste water to form calcium fluoride crystals. Compared with the coagulation/precipitation process that is utilized in factories to date, the advantages of the Jansen process are that the waste sludge is decreased and can be recycled. Since calcium fluoride has a very low solubility, such a crystallization process can effectively remove a great amount of fluoride. However, another result of the low solubility is that calcium fluoride will easily supersaturate in some locations, thus generating fine particles that can clog the pipes. For this reason, in practical use, waste water discharged from the factory with a high concentration of fluoride should be diluted to a concentration lower than 500 $mgF^-/l$. In order to accommodate such a great amount of diluted waste water, the cost for the apparatus and for the land for accommodating the apparatus is increased.

Japanese Patent No. 8-11232 has disclosed a coagulation process for removing fluoride from waste water. The process involves mixing fluoride-containing waste water with aluminum and sodium ions to form cryolite coagulate as a means to remove fluoride. The residual fluoride contained in the treated waste water can be further removed. A water soluble aluminum salt is added into the treated waste water at pH 7 to form flocs aluminum hydroxide [$Al(OH)_3$], which can adsorb residual fluoride in the treated waste water to form a coprecipitate. The coprecipitate can be adjusted to be basic or acidic, thus forming an aluminum ion source for the coagulation process for removing fluoride from waste water according to the procedures as mentioned above.

In Japanese Patent No. 8-11232, the cryolite is in a form of coagulation. The coagulated sludge contains about 60~80% water, which is very difficult to dehydrate. In addition, the coagulated sludge is in a very large volume, and has many impurities; thus, it is not easily recycled.

SUMMARY OF THE INVENTION

An object of the present invention is to solve the above-mentioned problems and to provide a crystallization process for removing fluoride from waste water economically and efficiently.

To achieve the object, the crystallization process for removing fluoride from waste water comprises the following steps of:

(a) introducing fluoride-containing waste water into a fluidized bed crystallizer provided with a carrier;

(b) adding a water soluble sodium reagent and a water soluble aluminum reagent into the fluidized bed crystallizer to form crystallized cryolite ($Na_3AlF_6$) onto the carrier with which the fluoride in the waste water can be removed, wherein the molar ratio of aluminum to fluorine is between 0.8~1:6, and the molar ratio of sodium to fluorine is larger than 0.5; and (c) discharging the treated waste water from the fluidized bed crystallizer to obtain a primary treated water.

BRIEF DESCRIPTION OF THE DRAWINGS

The present invention will become more fully understood from the detailed description given hereinbelow and the accompanying drawings, given by way of illustration only and thus not intended to be limitative of the present invention.

DETAILED DESCRIPTION OF THE INVENTION

Figure 1:
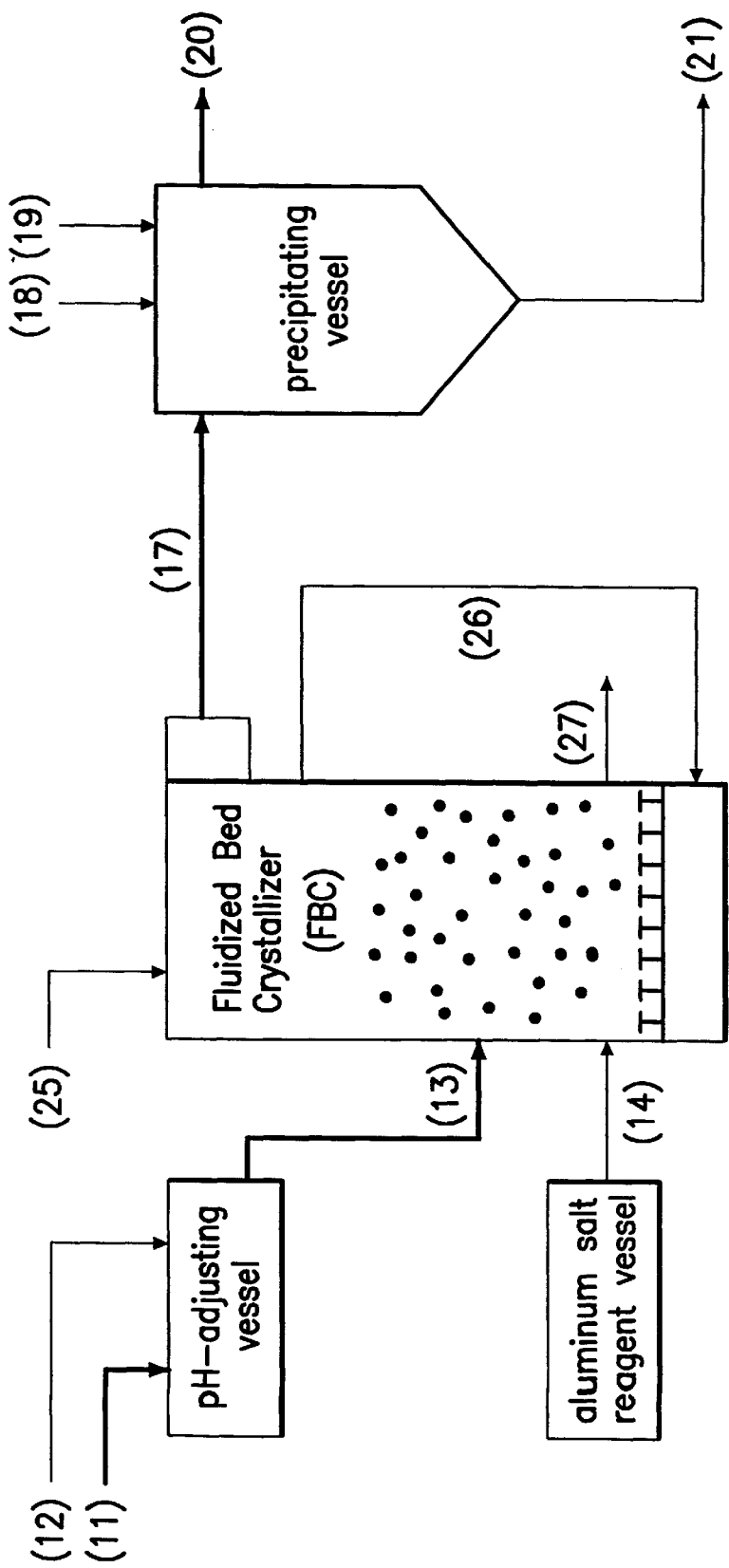
FIG. 1 is a schematic diagram showing the crystallization process for removing fluoride from waste water according to Example 1 of the present invention.

The present invention provides a crystallization process for removing fluoride from waste water. Fluoride-containing waste water is introduced into a fluidized bed crystallizer provided with a carrier. Then, a water soluble sodium reagent and a water soluble aluminum reagent are added into the fluidized bed crystallizer. In order to form cryolite ($Na_3AlF_6$), the sodium reagent and aluminum reagent added should adjusted to an amount such that the molar ratio of aluminum to fluorine is between 0.8~1:6, and the molar ratio of sodium to fluorine is larger than 0.5. By such ratios, cryolite ($Na_3AlF_6$) will be crystallized onto the carrier with which the fluoride in the waste water can be removed. Finally, the treated waste water is discharged from the fluidized bed crystallizer to obtain a primary treated water.

In order to increase the quality of the primary treated water, it can be further treated. A water soluble aluminum reagent is added into the primary treated water. Then, the primary treated water is adjusted to a pH of about 7 by a hydroxide of an alkaline metal to form insoluble floc aluminum hydroxide. The floc aluminum hydroxide will adsorb the fluoride in the primary treated water to form a coprecipitation, whereby the residual fluoride in the primary treated water can be further removed. Finally, the treated waste water obtained is separated from the coprecipitate to obtain a secondary treated water.

In order to obtain treated water with a desired quality, the secondary treated water can be further treated. The treating procedures include adding a water soluble aluminum reagent into the treated water and adjusting the pH to form insoluble aluminum hydroxide to adsorb the fluoride to form the coprecipitation. Such treating procedures can be repeated as desired until the final treated water reaches a desired concentration.

The coprecipitation of aluminum hydroxide and fluoride as mentioned above can be recycled to serve as the aluminum source for the crystallization process. Specifically, the coprecipitation is adjusted to pH of less than 3 or more than 11, thereby dissolving the coprecipitation to form aluminum ions. Such aluminum ions can serve as the water soluble aluminum reagent to be added into a fluidized bed crystallizer to undergo another crystallization process for removing fluoride.

In order to form as much cryolite crystal as possible, so as to remove as much fluoride as possible during crystallization, the carried cryolite with a large particle size can be removed from the fluidized bed crystallizer and replaced by a fresh carrier to form additional cryolite crystallization onto the carriers.

The water soluble aluminum reagents suitable for use in the present invention include aluminum chloride, aluminum sulfate, and aluminum nitrate.

The water soluble sodium reagents suitable for use in the present invention include sodium chloride, sodium hydroxide, sodium sulfate, and sodium nitrate.

In U.S. Pat. No. 5,106,509, a calcium reagent is used to react with fluoride in the waste water to form calcium fluoride crystal. In the present invention, a sodium reagent and an aluminum reagent are added to react with fluoride in the waste water to form cryolite crystal. The price of the cryolite crystal is ten times that of the calcium fluoride, therefore, the cryolite crystal is more valuable for recycling and re-utilization. In addition, the aluminum reagent used in the present invention can be recycled for re-utilization, while the calcium reagent used in U.S. Pat. No. 5,106,509 can not. For the treatment of the waste water containing a high concentration of fluoride, since cryolite has a high solubility (about 100–200 $mgF^-/l$), it is very easy to ensure that most of the cryolite formed is in the form of crystals and no fine particles are formed, even though the waste water has not been diluted. The ratio of the crystallized cryolite reaches about 91–97%, and the cost for the apparatus and energy in the present invention is about a tenth of that in U.S. Pat. No. 5,106,509. Therefore, the process of the present invention is more efficient.

In Japanese Patent No. 8-11232, the cryolite formed is in the form of coagulation. The coagulated sludge contains about 60~80% water, which is very difficult to dewater. In addition, the coagulated sludge is in a very large volume, and has many impurities; thus, it is not easily recycled. In the present invention, the cryolite formed is in the form of crystals, having a diameter of 1 to 2 mm. Such crystals contain about less than 10% water, and thus are very easy to dewater. Likewise, having of small volume, they are very convenient to transport. Furthermore, the crystal has a very high purity (higher than 90%), and therefore is suitable for re-utilization. In addition, the carrier in the fluidized bed crystallizer has a high specific surface area to react with fluoride and chemicals; therefore, it is more efficient.

EXAMPLE 1

Refer to FIG. 1, which is a schematic diagram showing the crystallization process for removing fluoride from waste water according to the Example 1 of the present invention.

A fluidized bed crystallizer (FBC) was filled with water and seeded with an adequate amount of a carrier (25). Circulated water (26) was introduced into the FBC to fluidize the carrier. Acidic fluoride-containing waste water (11) with a concentration of 5,500 $mgF^-/l$ was introduced into the pH adjusting vessel and was adjusted by NaOH (12) to a pH of 5. The adjusted waste water (13) was then introduced into the FBC provided with a carrier (25) at a flow rate of 10 ml/min. An aluminum reagent (14), with a pH of 3.8 and an aluminum ion content of 1,250 mg/l, was introduced into the FBC at a flow rate of 9 ml/min. The molar ratio of aluminum to fluorine was between 0.8~1:6, and the molar ratio of sodium to fluorine was larger than 0.5, such that the reaction of the aluminum reagent, NaOH, and the fluoride would cause cryolite ($Na_3AlF_6$) to be crystallized onto the carrier. After reacting for a period of time, cryolite (27) with a large particle size in the bottom of the bed was discharged and replaced with a new carrier (25) with a smaller particle size. In the crystallizer, the fluoride area loading was 10.5 $kgF^-/m^2 \cdot h$, and the pH was about 3.5.

The primary treated water (17) obtained had a fluoride concentration of 73 $mgF^-/l$, which was introduced into the precipitating vessel. For one liter of the primary treated water, 7.9 g of aluminum sulfate (18) was added. The mixture was stirred and 45% aqueous sodium hydroxide (19) was added to adjust the mixture to a pH of about 7.0. At that time, the water soluble aluminum ion was reacted to form insoluble floc aluminum hydroxide. The mixture was stirred for 15 minutes so as to make the floc aluminum hydroxide adsorb fluoride to form a white coprecipitation (21). The secondary treated water (20) discharged from the precipitating vessel had a fluoride concentration of 1.4 $mgF^-/l$, which can be directly discharged or further treated to obtain a lower fluoride concentration.

EXAMPLE 2

Figure 2:
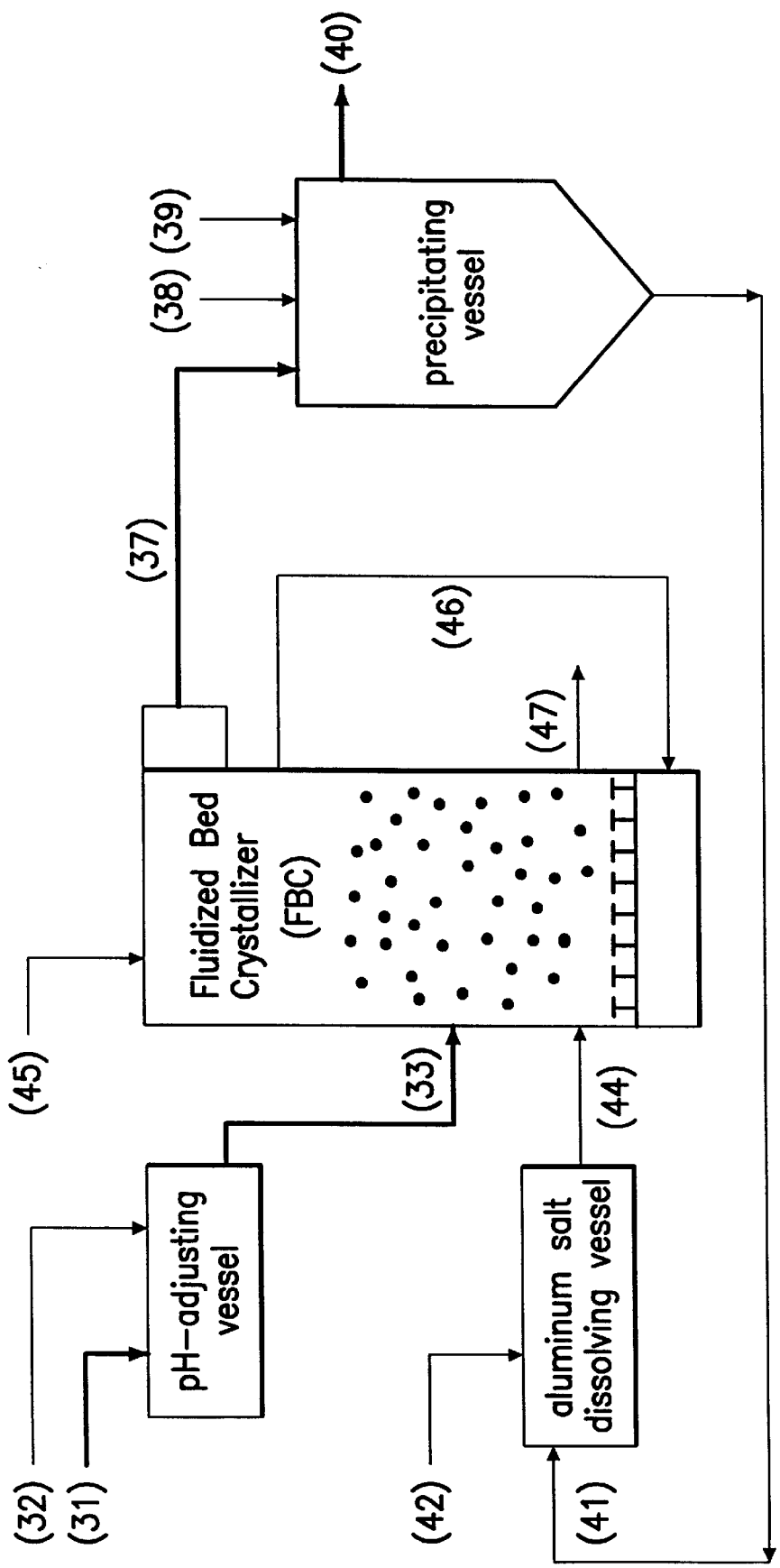
FIG. 2 is a schematic diagram showing the crystallization process for removing fluoride from waste water according to Example 2 of the present invention.

The coprecipitation (21) obtained from Example 1 can be practically recycled for utilization. Referring to FIG. 2, the white coprecipitation (41) of aluminum hydroxide and fluoride obtained from Example 1 was added to the aluminum salt dissolving vessel and a small amount of aluminum sulfate was replenished. Concentrated sulfuric acid (42) was added to the aluminum salt dissolving vessel to adjust the pH of the mixture to 1.8, such that floc aluminum hydroxide was dissolved into aluminum salt. At that time, the mixture in the aluminum salt dissolving vessel had an aluminum concentration of 1,350 mg/l and a fluoride concentration of 100 mg/l.

A fluidized bed crystallizer (FBC) was filled with water and seeded with an adequate amount of a carrier (45). Circulated water (46) was introduced into the FBC to fluidize the carrier. Acidic fluoride-containing waste water (31) with a concentration of 5,500 $mgF^-/l$ was introduced into the pH adjusting vessel and was adjusted by NaOH (32) to a pH of 12.4. The adjusted waste water (33) was then introduced into the FBC provided with the carrier (45) at a flow rate of 10 ml/min. The soluble aluminum salt reagent (44) obtained from the aluminum salt dissolving vessel as mentioned above, having an aluminum concentration of 1,350 mg/l and a fluoride concentration of 100 mg/l, was introduced into the FBC at a flow rate of 10 ml/min. The aluminum and sodium amount in the FBC was adjusted to such that the molar ratio of aluminum to fluorine was about 1:6, and the molar ratio of sodium to fluorine was larger than 0.5, such that the reaction of the aluminum reagent, NaOH, and the fluoride would form crystallized cryolite ($Na_3AlF_6$) onto the carrier. After reacting for a period of time, the crystallized cryolite (47) with a large particle size in the bottom of the bed was discharged and replaced with a carrier (45) with a smaller particle size. In the crystallizer, the fluoride area loading was 10.7 $kgF^-/m^2 \cdot h$, and the pH was about 3.1.

The primary treated water (37) obtained had a fluoride concentration of 260 mgF$^-$/l, which was introduced into the precipitating vessel. For one liter of the primary treated water, 7.9 g of aluminum sulfate (38) was added. The mixture was stirred and 45% aqueous sodium hydroxide (39) was added to adjust the mixture to a pH of about 7.0. At that time, the water soluble aluminum ion was reacted to form insoluble floc aluminum hydroxide. The mixture was stirred for 15 minutes so as to make the floc aluminum hydroxide to adsorb fluoride to form a white coprecipitation (41). The secondary treated water (40) discharged from the precipitating vessel had a fluoride concentration of 9 mgF$^-$/l. This proves that the soluble salt reagent obtained from the coprecipitate of aluminum hydroxide and fluoride is valuable for use in the treatment of waste water. In addition, the coprecipitation (41) can be added to the aluminum salt dissolving vessel to be treated as mentioned above to serve as the source of the soluble salt reagent for the treatment for waste water.

The results of Examples 1 and 2 are outlined in Table 1.

TABLE 1

| Example | the conc. of the feeding pH-adjusted waste water (mg/l) | | the conc. of the feeding aluminum salt reagent (mg/l) | | | the conc. of the water discharged from FBC (mg/l) | | | the ratio of the crystallized fluoride (%) | the conc. of the secondary treated water (mg/l) | |
|---|---|---|---|---|---|---|---|---|---|---|---|
| | F | Na | Al | F | Na | Ft | Fs | Al | | F | Al |
| 1 | 5,500 | 6,000 | 1,250 | — | — | 73 | 71 | 17.5 | 97 | 1.4 | — |
| 2 | 5,500 | 9,500 | 1,350 | 100 | 3,600 | 260 | 225 | 125 | 91 | 9 | 0.9 | conc. is the abbreviation of concentration.
Ft indicates the concentration of the total fluoride.
Fs indicates the concentration of the soluble fluoride.

In addition, the cryolite crystal obtained from the fluidized bed crystallizer was further conducted to qualitative analysis and quantitative analysis.

Figure 3:
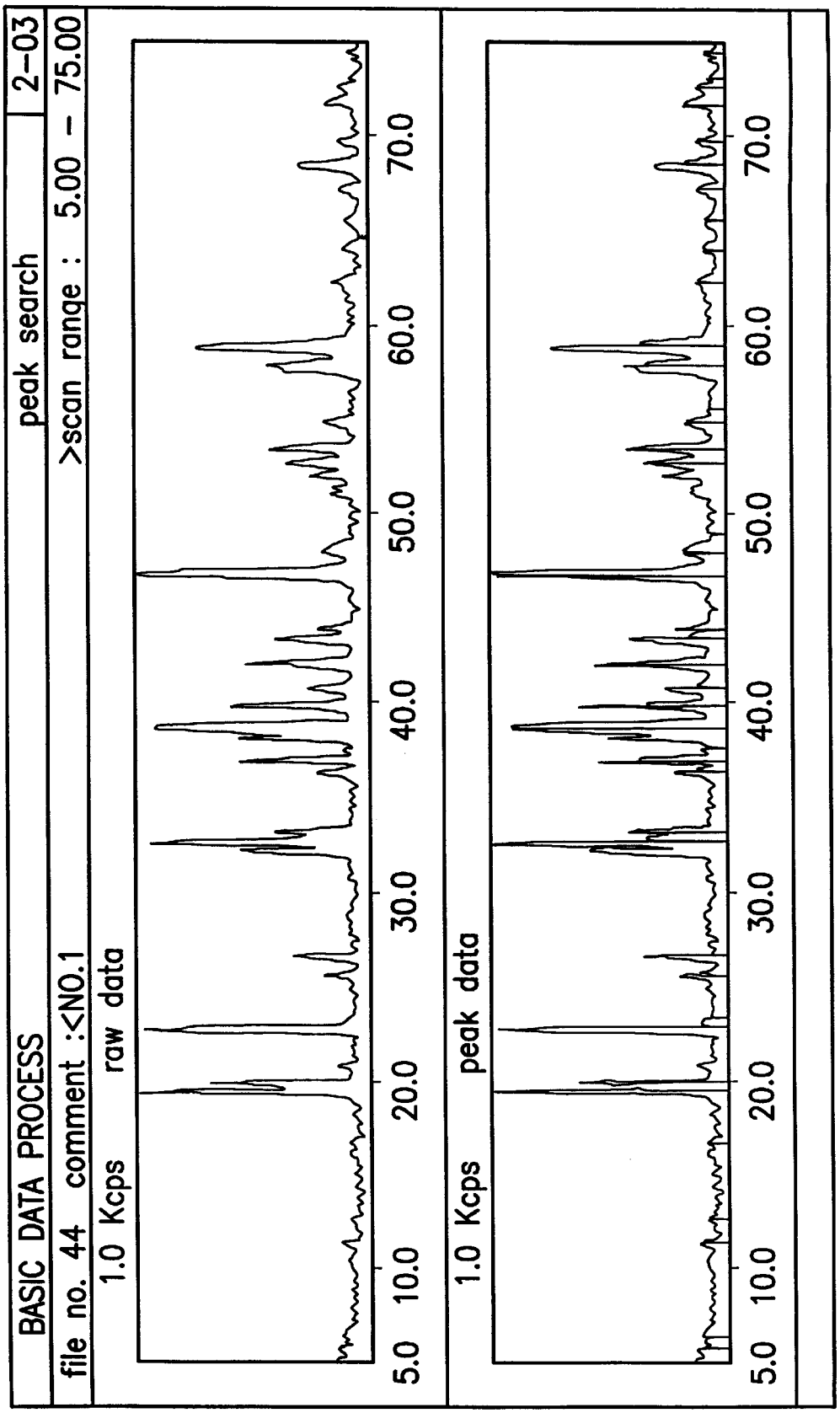
FIG. 3 shows the X-ray diffraction diagram of the cryolite crystal obtained in the fluidized bed crystallizer of the present invention.

1. Qualitative analysis:

The white crystal obtained in the present invention was analyzed with an X-ray diffraction analyzer (XRD). FIG. 3 is the XRD diagram of the white crystal obtained in the present invention. Table 2 shows the 2θ, d, and I/I$_1$ values of the ten stronger peaks in the XRD diagram for the standard cryolite and the crystal obtained from the present invention respectively. From FIG. 3 and the data of Table 2, it can be seen that the data of the standard cryolite is very close to that of the crystal obtained from the present invention, indicating that the crystal obtained from the present invention is cryolite.

TABLE 2

The comparison of the XRD diagram between the standard cryolite and the crystal obtained from the present invention

| sample | 2θ (deg) | d (Å) | I/I$_1$ |
|---|---|---|---|
| standard cryolite | 58.7 | 1.5710 | 35 |
| | 57.8 | 1.5950 | 14 |
| | 53.2 | 1.7090 | 20 |
| | 46.7 | 1.9430 | 95 |
| | 39.7 | 2.269 | 25 |
| | 38.8 | 2.321 | 25 |
| | 32.6 | 2.748 | 100 |
| | 32.0 | 2.797 | 25 |
| | 22.9 | 3.886 | 65 |
| | 19.5 | 4.540 | 55 |
| crystal obtained from the present invention | 58.8 | 1.5702 | 44 |
| | 57.9 | 1.5912 | 24 |
| | 53.5 | 1.7119 | 18 |
| | 46.8 | 1.9379 | 100 |
| | 39.9 | 2.2595 | 25 |
| | 38.5 | 2.3362 | 49 |
| | 32.5 | 2.7557 | 99 |
| | 32.0 | 2.7915 | 35 |
| | 22.8 | 3.8894 | 80 |
| | 19.6 | 4.5228 | 57 |

2. Quantitative analysis:

The white crystal obtained from the present invention was dissolved with an acid to analysis the concentration of F, Al, and Na. The dissolved crystal solution had a concentration of 6,900 mg F/L, 1,800 mg Al/L, and 4,200 mg Na/L. That is to say, the molar ratio of F:Al:Na was 6:1.1:3. The molar ratio of F:Al:Na of standard crystal is also 6:1.1:3. Therefore, it can be concluded that the white crystal obtained in the present invention is cryolite.

What is claimed is:

1. A crystallization process for removing fluoride from waste water, comprising the following steps of:
    (a) introducing fluoride-containing waste water into a fluidized bed crystallizer provided with a carrier;
    (b) adding a water soluble sodium reagent and a water soluble aluminum reagent into the fluidized bed crystallizer to form crystallized cryolite (Na$_3$AlF$_6$) onto the carrier with which the fluoride in the waste water can be removed, wherein the molar ratio of aluminum to fluorine is between 0.8~1:6, and the molar ratio of sodium to fluorine is larger than 0.5; and
    (c) discharging the treated waste water from the fluidized bed crystallizer to obtain a primary treated water.

2. The process as claimed in claim 1, further comprising:
    (d) adding a water soluble aluminum reagent into the primary treated water;
    (e) adjusting the primary treated water to a pH of about 7 by a hydroxide of an alkaline metal to form insoluble aluminum hydroxide, such that aluminum hydroxide adsorbs the fluoride in the primary treated water to form a coprecipitate, whereby the residual fluoride in the primary treated water can be further removed; and (f) separating the treated waste water obtained from step (e) from the coprecipitate to obtain a secondary treated water.

3. The process as claimed in claim 2, further comprising:

(g) adding a water soluble aluminum reagent into the secondary treated water;

(h) adjusting the secondary treated water to a pH of about 7 by a hydroxide of an alkaline metal to form insoluble aluminum hydroxide, such that aluminum hydroxide adsorbs the fluoride in the secondary treated water to form a coprecipitation, whereby the residual fluoride in the secondary treated water can be further removed; and (i) separating the treated waste water obtained from step (h) from the coprecipitation to obtain a tertiary treated water.

4. The process as claimed in claim 1, after step (b) and before step (c), further comprising:

(b1) removing the crystallized cryolite out of the fluidized bed crystallizer; and (b2) supplementing a fresh carrier into the fluidized bed crystallizer to form crystallized cryolite onto the carrier.

5. The process as claimed in claim 1, wherein the water soluble aluminum reagent in step (b) is selected from the group consisting of aluminum chloride, aluminum sulfate, and aluminum nitrate.

6. The process as claimed in claim 1, wherein the water soluble sodium reagent in step (b) is selected from the group consisting of sodium chloride, sodium hydroxide, sodium sulfate, and sodium nitrate.

7. A crystallization process for removing fluoride from waste water, comprising the following steps of:

(a) introducing the fluoride-containing waste water into a fluidized bed crystallizer provided with a carrier;

(b) adding a water soluble sodium reagent and a water soluble aluminum reagent into the fluidized bed crystallizer to form crystallized cryolite ($Na_3AlF_6$) onto the carrier with which the fluoride in the waste water can be removed, wherein the molar ratio of aluminum to fluorine is between 0.8~1:6, and the molar ratio of sodium to fluorine is larger than 0.5; and (c) separating the treated waste water from the carried crystalline cryolite to obtain a primary treated water, wherein the water soluble aluminum reagent is obtained by adjusting the pH of the coprecipitation obtained from step (e) of claim 2 to less than 3.

8. A crystallization process for removing fluoride from waste water, comprising the following steps of:

(a) introducing the fluoride-containing wastewater into a fluidized bed crystallizer provided with a carrier;

(b) adding a water soluble sodium reagent and a water soluble aluminum reagent into the fluidized bed crystallizer to form crystallized cryolite ($Na_3AlF_6$) onto the carrier with which the fluoride in the waste water can be removed, wherein the molar ratio of aluminum to fluorine is between 0.8~1:6, and the molar ratio of sodium to fluorine is larger than 0.5; and (c) discharging the treated waste water from the crystallized cryolite to obtain a primary treated water, wherein the water soluble aluminum reagent is obtained by adjusting the pH of the coprecipitation obtained from step (e) of claim 2 to more than 11.

* * * * *